Figure 1:
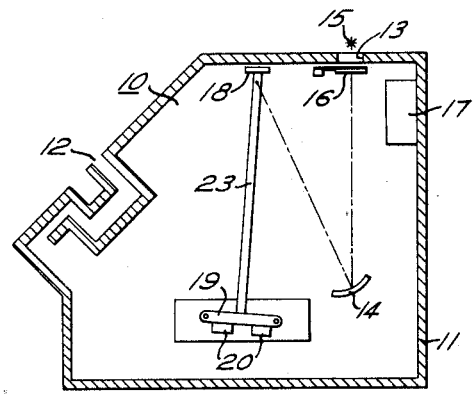

Sept. 19, 1950     A. J. WILLIAMS, JR     2,522,976

ELECTRICAL RATIO-MEASURING SYSTEM

Filed Dec. 13, 1946     3 Sheets-Sheet 1

INVENTOR
ALBERT J. WILLIAMS, JR.
BY
Woodcock and Phelan
ATTORNEYS

Sept. 19, 1950 A. J. WILLIAMS, JR 2,522,976
ELECTRICAL RATIO-MEASURING SYSTEM
Filed Dec. 13, 1946 3 Sheets-Sheet 2
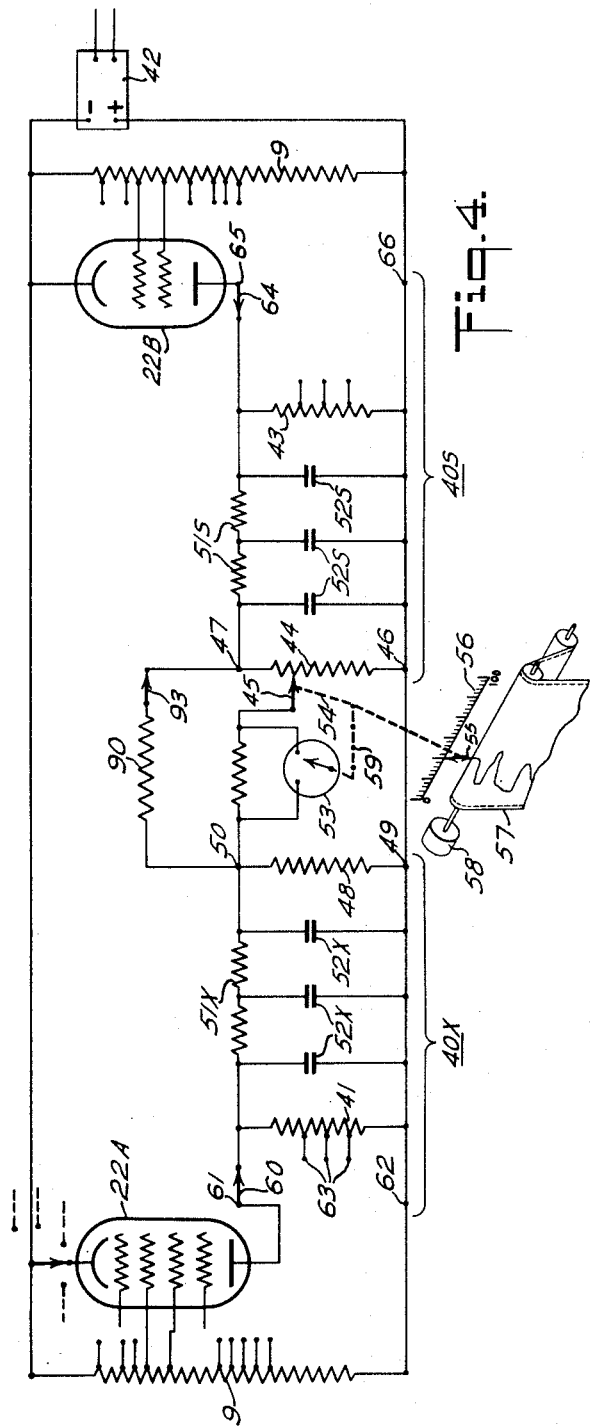
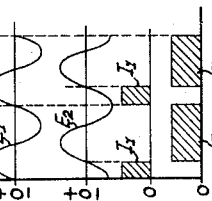
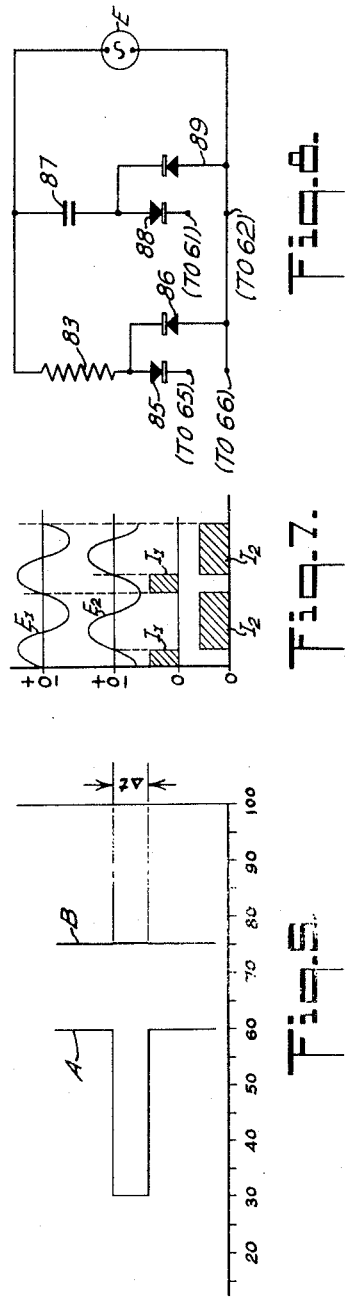
INVENTOR
ALBERT J. WILLIAMS, JR
BY
Woodcock and Phelan
ATTORNEYS

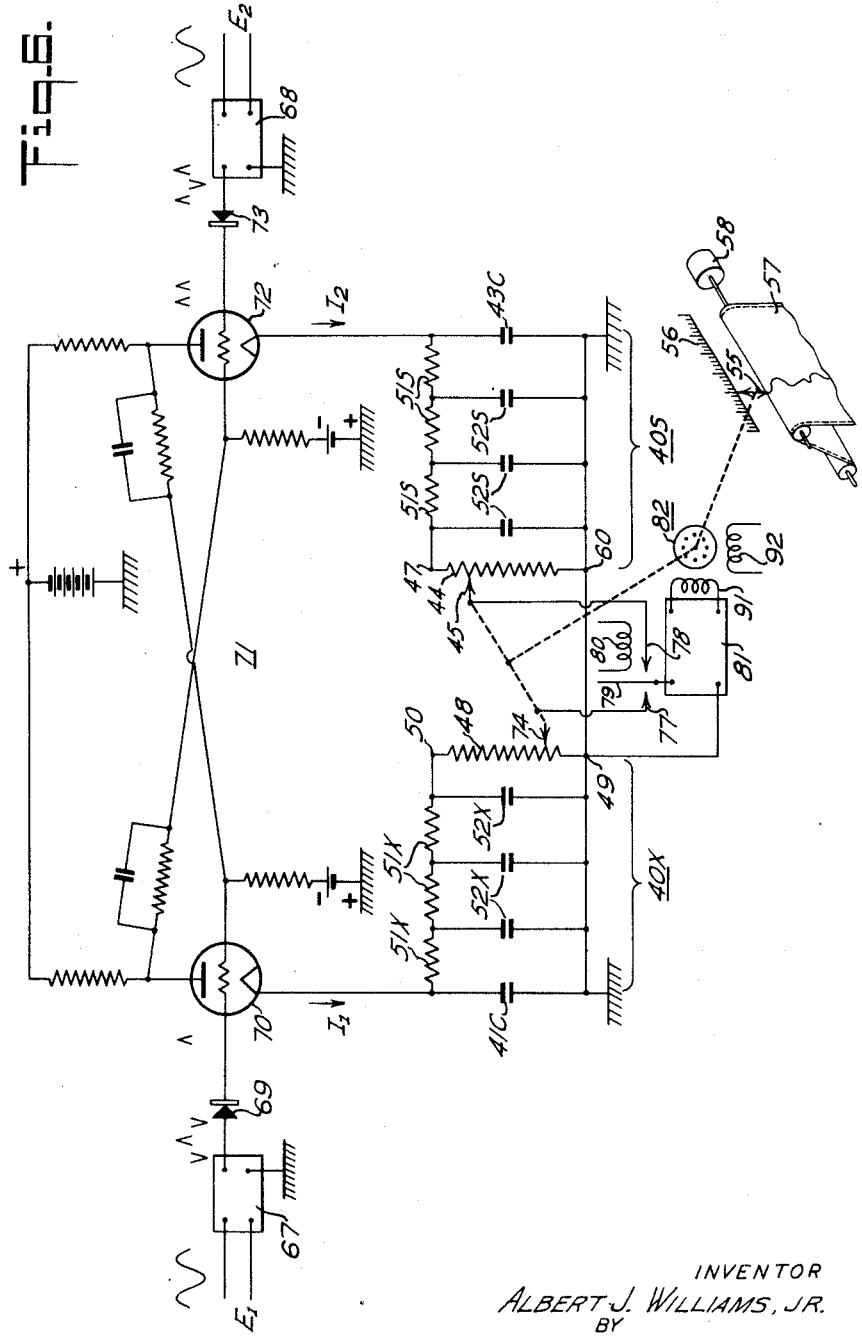

Patented Sept. 19, 1950

2,522,976

UNITED STATES PATENT OFFICE 2,522,976

ELECTRICAL RATIO-MEASURING SYSTEM

Albert J. Williams, Jr., Philadelphia, Pa., assignor to Leeds and Northrup Company, Philadelphia, Pa., a corporation of Pennsylvania Application December 13, 1946, Serial No. 715,936

19 Claims. (Cl. 250—214)

1

This invention relates to electrical indicating or recording systems generically termed "measuring systems" and particularly relates to systems for measuring the ratio of two currents in determination, for example, of the percentage composition of alloys, or the frequency of an alternating current, or the phase relation between currents of the same frequency or repetition rate.

In accordance with the invention, there are utilized two filter networks having similar time response characteristics and in whose input circuits are respectively included the sources of periodically or randomly fluctuating currents, the ratio of whose average magnitudes is to be determined. By adjustment of the calibrated output impedance of one or both of the filter networks, the voltage drops across known percentages of the output impedances are balanced so that the ratio of the average magnitudes of the currents then corresponds with the impedance setting.

Further in accordance with the invention and more specifically, the input impedances of the two averaging networks are Ayrton shunts which can be adjusted for determination of the ratio of the currents over a wide range and with retention of the desired damping or averaging effects of the networks.

More specifically, and as utilized in a spectrographic analyzer or photometer using photoelectric cells disposed to view or scan different regions or lines of the spectrum of an arc or spark discharge, the input resistors of the aforesaid averaging networks are each connected in series with one of the cells and the common source of their anode current. The ratio of the photocell currents affords an accurate quantitative determination of the composition of the discharge electrodes despite variations due to instability of the arc or spark to random fluctuations of the different lines or regions of the spectrum concurrently viewed or scanned by the cells, and to fluctuations of the voltage supply for the cells.

Further in accordance with the invention, the output resistors of the two averaging networks are interconnected by a high auxiliary resistance insuring that for null-light input to the measuring cell, the zero current ratio corresponds with a slidewire setting which is slightly displaced from the otherwise normal zero setting of the slidewire. In the absence of such auxiliary resistance, the presence of a negative stray current would be unnoticed because corresponding with an unattainable subzero setting of the slidewire.

Figure 3:
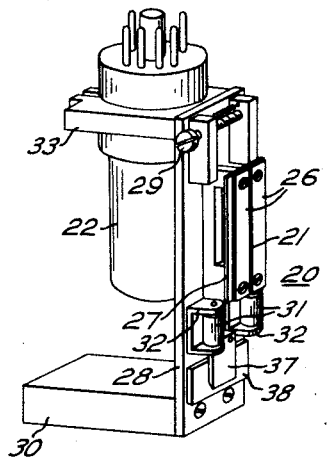
Figure 2:
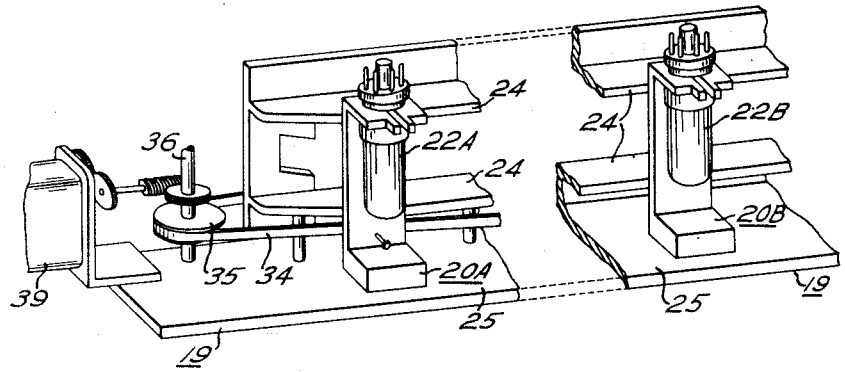

For a more detailed understanding of the invention and for illustration of various systems embodying it, reference is made to the accompanying drawings, in which:

Fig. 1 diagrammatically illustrates a spectrographic analyzer installation;

Fig. 2, in perspective, in part illustrates a scanning arrangement used in the spectrograph of Fig. 1;

Fig. 3, in perspective and on enlarged scale, shows the construction of one of the tube-and-slit units of Fig. 2;

Fig. 4 schematically illustrates the basic measuring circuit as used with the spectrograph of Fig. 1;

Fig. 5 is an explanatory figure referred to in discussion of Fig. 4;

Fig. 6 schematically illustrates a phase-measuring system including as one of its components a modification of the basic ratio-determining circuit of Fig. 4;

Fig. 7 is an explanatory figure referred to in discussion of Fig. 6; and

Fig. 8 discloses a network suitable for use in combination with the basic ratio circuit of Fig. 4 in the measurement of frequency.

Referring to Fig. 1 as illustrative of a photometer or spectrographic analyzer installation utilizing the invention, the whole spectrograph, preferably of the grating type because affording higher available resolution and mechanical simplicity of the phototube mounting arrangement, is within a room or enclosure 10 defined by a partition or wall 11. Entrance to the enclosure is provided through a maze 12 without admission of extraneous light. The entrance slit 13 of the spectrograph is formed by an opening in the wall and is interposed between the collimating mirror 14, within room 10, and the light source 15, preferably accessible exteriorly of room 10 for insertion of samples to be analyzed. It shall be understood that in accordance with usual practice, pieces of the sample are used as the electrodes of an arc or spark discharge forming the light source 15. A shutter 16 is provided for controlling passage of radiation from the entrance slit 13 to mirror 14. The shutter may be controlled either manually from the control board 17 or automatically by a control system similar to that disclosed in a copending application, Serial No. 662,531, of Dieke, a co-worker of mine.

The radiation is directed by the collimating mirror 14 to the grating 18 which may be mounted on one end of a pivoted beam 23 upon whose other end is mounted the holder or track member 19 which supports one or more units 20, Fig. 3, each comprising an exit slit 21 and a photomultiplier cell 22, in the focal plane of the spectrum. The member 19, which in location and general purpose corresponds with the conventional plate holder of a photographic type of spectrograph, may be provided with a focusing adjustment for movement along the beam 23 toward or away from grating 18 or other equivalent spectrum-producing element. Such focusing adjustment is effected after that portion of the spectrum which is of interest has been brought within the range of holder 19 by swinging the beam 23 to the proper angle.

Photo-electrically to measure the intensity of selected lines of the spectrum, each line must be individually isolated. This is effected by the disposition of the exit slit 21 of one of the units 20 exactly on the focal curve of the spectrum and by fixing the slit at the location of that line or by causing it to scan such location. The corresponding tube 22 mounted behind each exit slit produces a current whose magnitude is a function of the intensity of the spectrum line which it views or scans. As shown in Fig. 2, the focal curve of the holder 19 is determined by one or more curved metal plates or strips 24 secured and extending horizontally from the rear face of the holder 19. Each unit 20 is so constructed that when it is against plate 24 at any portion along the length thereof, the exit slit 21 of that unit is exactly on the focal curve of the spectrum.

By placing a pair of such units, 20A and 20B, at proper locations against the plate 24, each unit produces a current which can be interpreted in terms of intensity of the radiation at a particular wavelength and the ratio of these currents, measured as hereinafter described, is accurately representative of the relative proportion in a sample of two of its constituents.

Reverting to the construction of the units which are identical, the exit slit 21, as shown in Fig. 3, is defined by two spaced strips 26 suitably fastened to an aperture strip 27 secured to a block pivotally mounted on the vertical front plate 28 of the unit. By adjustment of screw 29, the block may be rotated to bring the slit exactly parallel to the spectrum lines. The phototube 22 of each unit is held in position behind its exit slit 21 by the split ring member 33 secured to the upper end of plate 28 and extending rearwardly therefrom. The base 30 of the unit is heavy to bring the center of gravity of the unit as low as possible and is provided on the underside with ball bearings, not shown, that it may slide freely along the plate 19 when the unit is driven, as hereinafter described, to scan a desired line or lines. The roller bearings 31 for engaging the focal curve plate 24, are suitably mounted as in brackets 32 upon the front plate 28 of the unit.

In a preferred mode of operation, one of the units is fixed in position continuously to view a selected line, for example the iron line 3175.4, when the sample is predominantly iron, and the other unit or units are held as by their clamping members 37 and 38 to a thin metal band 34 which passes over a pair of pulleys 35 respectively mounted at opposite ends of the holder 19 upon vertical shafts 36 and is driven by a motor 39 (only one pulley and shaft are shown). A spring, not shown, maintains the band 34 under tension and firmly presses the scanning unit or units against plates 24.

If the analyzer is designed for one specific purpose, two or more cell-slit units above described, or simpler ones, may be permanently mounted. Such arrangement, however, is not suited without complications introduced by the use of mirrors or prisms for measurements involving spectrum lines whose spacing is less than the width of a unit 20 and even with such additional components is not suited when the lines are very close, within a millimeter or less. Another disadvantage of the fixed unit arrangement is that after they have been permanently set, the spectrograph may get out of adjustment and the desired lines move partly or completely off the exit slits. This may readily happen because, for example, a temperature change of only a few degrees may be sufficient to so upset the geometry of the spectrograph that such misalignment will occur.

When the scanning unit or units are of construction such as shown in Fig. 3, the scanning of one or more lines effected by moving the band 34 at suitable speed and direction causes each unit 20 clamped thereto to move along the focal curve between limits set to include the spectrum line or lines whose intensity is to be compared with respect to that of the line viewed by the fixed unit. As apparent from Fig. 2, the movement of band 34 may be effected by motor 39 coupled to one of the pulleys 35 by a suitable gear-reduction train for the selection of different speed ratios. For example, the band may be made to travel at any one of the rates of 20, 8, 4, 2, or 0.8 millimeters per minute corresponding respectively, in a particular spectrograph using such construction, to a motion of 100, 40, 20, 10 and 4 Angstrom units per minute in the first order spectrum. Reference is made to the aforesaid Dieke application for a detailed disclosure of a control system for motor 39 and for other components of the spectrograph system.

When two or more scanning cells 22A are used, the control circuit may automatically provide for their selective inclusion in circuit with the fixed or reference cell 22B as each in turn approaches the location of a desired line or region of the spectrum, and the switching sequence may be reversed as the scanning motor is reversed, so to provide a double record for checking purposes and to bring the system in readiness for the next cycle after replacement of the sample by the next one to be analyzed.

The photomultiplier tubes 22 may, for example, be of the 931A, 1P21 or 1P28 types, such as manufactured by the Radio Corporation of America. The radiation through the exit slits strikes the photocathode and liberates electrons which are accelerated to the first dynode and there liberate a greater number of electrons; this multiplication continues as the electrons are accelerated to each successive dynode so that extremely large effective amplification results. Fluctuations in the dynode voltages substantially affect the output current of the tube and would ordinarily be a serious source of error.

There are other common sources of error in the usual spectrographic analyzer systems. For example, when a number of different lines are to be measured successively, the light source should remain constant during the whole series of measurements but few of the light sources used in spectrographic analysis and none of them in routine industrial analyses have such constancy. Moreover, the circumstance that in the light-source electrodes there is segregation causes random variations in the intensities of the lines corresponding with the segregated element as the successive sparks strike different points in the electrodes. In the example given, the line viewed by cell 22A is, of course, more subject to such random fluctuations as the line viewed by cell 22B is that of a predominant element. With the system disclosed in Fig. 4 and now described, the fluctuations in intensity of the light source, in intensity of different lines, or in the source of supply voltage 42 for the photomultiplier tubes, do not affect the accuracy of the measurements for reasons which will appear from the subsequent discussion.

The measuring system, Fig. 4, comprises two filtering networks 40X and 40S whose input impedances are respectively connected in series with the photomultiplier tubes 22A and 22B. More specifically, the shunt input resistance 41 of the network 40X is connected in series with the photomultiplier tube 22A, which may be used to view or scan one line of the spectrum, and the source of anode current 42. The shunt input resistor 43 of the other network 40S is connected in series with the tube 22B, fixed continuously to view a predetermined line of the spectrum, and the current source 42. The various dynode voltages for the tubes 22A and 22B may conveniently be derived from the voltage-divider resistors 9.

The output impedance of the network 40S is preferably a slidewire resistance 44 provided with a relatively adjustable contact 45 for engagement with the slidewire intermediate its terminals 46 and 47. The output impedance of the network 40X is a fixed resistor 48 whose terminals 49 and 50 may be considered as the output terminals of the network 40X. Each of the networks 40X and 40S is provided between its input and output impedances with one or more sections comprising series resistors (51X, 51S) and shunt capacitors (52X, 52S). The time response characteristics of the two networks 40X and 40S are substantially equal so that each has the same filtering or averaging effect as the other with respect to any rapid fluctuations of current through the associated photomultiplier cell.

In this as in other modifications later described, the current traversing the output impedance of each of the networks is the running average or logarithmic average of the fluctuating input to the network.

The whole or predetermined fixed portion of the output impedance 48 of network 40X and the continuously variable known portion of the output impedance of the network 40S are included in circuit with a detector system or device generically represented by galvanometer 53 to form a balanceable network or loop. For null response of the detector 53, the voltage drop between terminals 49 and 50 of network 40X is equal to the voltage drop between the terminal 46 and variable contact 45 of the output impedance of network 40S. When contact 45 is adjusted to position affording such null response, the slidewire setting corresponds with a particular ratio between the two photocell currents which in turn is definitely related to the relative intensities of the two lines of the spectrum being concurrently viewed by the cells 22A and 22B. Any rapid fluctuations of the photocell currents, whether at the same rate or at different rates, are averaged out by the filtering action of the networks so that though the rebalancing of the network may be effected automatically at high speed, as by recorder mechanism disclosed in my U. S. Letters Patent #2,367,746, the measurements and record made truly represent the ratio of the average magnitudes of the currents, and, therefore, the proper ratio of the intensities of the two spectrum lines. Overshooting or hunting is avoided by selection of the constants of network 40X, as later described, to obtain proper damping action. At sacrifice of rapidity of recording, the time response characteristic of network 40X may be increased further to smoothen out fluctuations due to segregation of elements in the electrodes: the time-response characteristic of network 40S must be correspondingly increased so that both networks are effective to cancel out the effects of common sources of fluctuation.

The effect of concurrent variations, for example, slow changes of the supply source voltage, do not affect accuracy because both tubes are supplied from the same source and it is the ratio of their output currents which is measured rather than the individual output of a single cell scanning or viewing a particular spectrum line. Furthermore, random fluctuations of intensity of the lines, due to segregation in the electrodes, are averaged by the filter networks so that balance of the network accurately corresponds with the average ratio of the concentrations of the selected elements of the electrodes.

One significant advantage of comparing the intensity of a line with respect to the intensity of a reference line of the same spectrum rather than measuring the intensity of a single line is apparent from Fig. 5. Referring to curve A of Fig. 5, for example, representing measurement over a predetermined interval of the anode current of tube 22A, the apparent intensity of the line was substantially lower during the interval $\Delta t$ when, in fact, the current change was due, for example, to change of the supply voltage for the tube. In contrast therewith, reference is made to curve B, showing the ratio of the currents of the two tubes 22A and 22B, the latter concurrently viewing another selected line of the spectrum; by this method, that is, with the measurement effected by the system shown in Fig. 4, the same substantial change in supply voltage during interval $\Delta t$ had but insignificant effect upon the measurement.

As schematically indicated in Fig. 4, the movable contact 45 is mechanically coupled to structure 55 which may coact with a scale 56 to indicate in percentage the ratio of the intensity of the spectrum line viewed by tube 22A to the intensity of the line viewed by the tube 22B and selected as a reference. Alternatively, and in addition, structure 55 may serve as a stylus or pen for tracing on a record chart 57 the relative intensity of one or more lines of the spectrum as scanned by tube 22A when moved along the focal curve of the spectrum. The chart 57 may be driven by a constant-speed motor 58 or equivalent timing device.

To adapt the basic measuring circuit for measurement of a wide range of ratios, including those for which the current of tube 22A may be higher or lower than that of tube 22B, and without changing the damping or averaging effects of the networks 40X and 40S, the input impedances 41 and 43 of the respective networks may be, as indicated, of the Ayrton shunt type. More specifically, the proportion of input resistor 41 effectively connected between the input terminals 61 and 62 of network 40X may be selected by adjustment of the contact 60 to engage one of the fixed contacts 63. Similarly, the input resistor 43 of network 40S may be provided with a contact 64 selectively to include the desired proportion of the resistor 43 in circuit with the input terminals 65, 66 of that network. As previously stated, by recourse to this method of changing the sensitivity of the system, there is avoided impairment of the damping or averaging properties of the two networks 40X and 40S.

It is not necessary that the corresponding resistors and capacitors of the two networks be of equal magnitude: in fact in the system shown in Fig. 4, the resistance of each of resistors 43, 51S and 44 of network 40S may be much lower than the resistance of the corresponding resistors 41, 51X and 48 of network 40X, but the capacity of capacitors 52S of network 40S in such case is proportionately higher than the capacity of capacitors 52X of network 40X to attain similarity of the time response characteristics of the two networks notwithstanding difference in their respective impedances as seen by the detector or by the related photo-tube circuit. To obtain a good damping action by filter 40X and so avoid hunting or overshooting of the automatic rebalancing system, the output resistor 48 across the output capacitor 52X should be of resistance high with respect to the remainder of the effective series resistance in the balancing loop.

By way of example, the circuit constants for the two networks may be, in round numbers

*Network 40X*

| | | |
|---|---|---|
| Resistor 41 | ohms | 135,000 |
| Resistors 51X | do | 45,000 |
| Resistor 48 | do | 45,000 |
| Capacitors 52X | mfd | 1 |

*Network 40S*

| | | |
|---|---|---|
| Resistor 43 | ohms | 14,000 |
| Resistors 51S | do | 5,000 |
| Resistor 44 | do | 5,000 |
| Capacitors 52S | mfd | 10–20 |

It shall be understood the networks 40S and 40X need not be of the resistance-capacity type, but that the desired response characteristics may be obtained by combinations of resistance and inductance or of resistance, inductance and capacity.

Preferably and as shown, the output terminals 50 and 47 of the two networks are connected by resistor 90 having high resistance. In the absence of such resistor, should the ratio of any stray current of the cell 22A to the current of cell 22B be negative, the position of contact 45 at one end of the scale under conditions of null-light input to the cell could be misinterpreted, whereas with resistor 90 in circuit the position of normal balance of contact 45 for null-light input to the cell 22A is slightly up scale so that a stray current ratio, either positive or negative, under conditions of null-light input to cell 22A would at once be evident because of displacement of contact 45 in corresponding sense from the offset zero position so established by resistor 90. The slight loss in effective measuring range, for example 1%, is more than compensated by the security attained.

Use of the basic measuring circuit is not limited to determination of the ratio between the output currents of photomultiplier cells; for example, in the system shown in Fig. 6, it is used for measurement of the phase relation between two currents or voltages having the same frequency or repetition rate but not necessarily of the same wave-form. More specifically, one of the voltages E1, which may be a sinusoidal voltage, is applied to a shaping network of known type and generically represented by block 67 to provide two series of sharp pulses; the positive pulses are each initiated at a fixed time, for example, at the beginning or end of the positive half waves of voltage E1 and the negative pulses are each initiated at corresponding points of the negative half-wave voltages. Of these pulses, the negative series may be eliminated by rectifier 69 and the positive pulses applied to the grid of one of the tubes 70 of the "flip-flop" circuit or electronic switch 71. A known form of such circuit has been schematically shown and need not be further described. Each of the positive pulses applied to tube 70 initiates a conduction period which is terminated when the other tube 72 of the flip-flop circuit receives a positive impulse similarly derived from a second voltage or current E2 by the pulse-sharpening network 68 and rectifier 73. Each of the positive pulses applied to tube 72 not only terminates the conduction period of tube 70 but also initiates a conduction period of tube 72, which continues until the next positive pulse of voltage E1 is applied to tube 70. If either or both of the cyclically-varying voltages E1, E2 is or are originally sharply peaked pulses, one or both of the networks 67, 68 may, of course, be omitted and if either or both are originally sharply peaked positive pulses, one or both of the rectifiers 69, 73 may be omitted.

In any event, the relative duration of the periods of conduction of tubes 70 and 72 depends upon the phase relation between the two voltages E1 and E2. This will become more readily apparent by reference to Fig. 7. Each time the voltage E1 crosses the zero axis in positive direction, a current impulse $I_1$, Fig. 7, is initiated by conduction through tube 70. Each time the voltage E2 crosses the zero axis in positive direction the current $I_1$ through tube 70 is interrupted and current $I_2$ begins to flow through tube 72 and continues to do so until the next time voltage E1 crosses the zero axis in a positive direction. Thus, for each cycle of voltage E1 or E2, there are periods of conduction through first one and then the other of the tubes 70 and 72, the relative duration of the periods depending upon the phase relation between voltages E1 and E2. With the voltages 180° out of phase, the conducting periods are equal: they are complementarily varied for other phase relations depending upon whether the shift from the 180° phase relation is positive or negative, or more generally the phase angle $a$ may be expressed as:

$$(1) \qquad \alpha = \frac{I_1}{I_1 + I_2}$$

To measure the phase relation of the voltages E1 and E2, the input impedance of one of the filter networks 40X, 40S is connected in series with one of the tubes 70 of the flip-flop circuit, and the input impedance of the other averaging network is connected in series with the other tube 72 of the flip-flop circuit. Because of the averaging effect of the networks 40X, 40S, the application of the current pulses $I_1$ and $I_2$, Fig. 7, to the respective input impedances of the networks produces in the respective output impedances of the networks continuous flow of two currents whose average magnitudes respectively correspond with the impulses $I_1$ and $I_2$ averaged with respect to time.

To obtain a linear relation between phase changes and the rebalancing adjustments, the output impedances of the networks 40X, 40S are respectively provided with adjustable contacts 74 and 45 so mechanically coupled that as one of them is moved away from the common potential point (49, 60) of those impedances the other of them is moved toward that point and vice versa: that is, the contacts are concurrently moved in opposite directions to effect equal and opposite changes in the effective magnitudes of resistors 44 and 98 included in the balancing loop.

With such arrangement, the setting X of contact 45 is directly proportional to the phase angle between the two currents $I_1$ and $I_2$, because at balance, $$(2) \qquad x = \frac{I_1}{I_1 + I_2}$$

and therefore from equation (1)

$$x = a$$

Thus, by determining this ratio of these currents, the phase relation of the voltages $E_1$ and $E_2$ may be read from a linear scale. The ratio of the currents in the output impedances of the networks 40X and 40S is preferably determined by a high-speed measuring or recording system similar to that disclosed in my aforesaid patent. As briefly herein shown, this system comprises a synchronous vibrator having a contact 79 which alternately engages fixed contacts 77, 88, respectively connected to the terminals 74 and 45 of the networks 40X and 40S, an amplifier 81 and a motor 82 for effecting relative adjustment of contact 45 and slidewire 43 in accordance with the output of amplifier 81.

When contacts 45 and 74 are in position corresponding with the then existing phase relation of the voltages $E_1$ and $E_2$, the vibration of contact 79 produces null signal input for the amplifier 81, and winding 91 of motor 82 remains de-energized. When, however, the phase relation does not correspond with the slidewire setting, the amplifier receives a signal and the motor 82 turns in proper direction to effect balance. The actuating coil 80 of the vibrator and the winding 92 of the motor are energized in fixed phase relation from the same source so that the polarity or sense of the input signal of the amplifier 81 is always the proper sense or polarity to insure rotation of motor 82 in proper direction to effect balance. For this use of the basic measuring circuit, the resistance 90 is not used and may be omitted or cut out of circuit by a switch 93 (Fig. 4). In this system, moreover, the input impedances of the networks may be capacitors 41C, 43C instead of resistors because the output impedances are utilized as current sources rather than voltage sources.

The fundamental ratio-measuring circuit may also be used to determine the frequency of an alternating current or voltage by using a simple network such as shown in Fig. 8.

Essentially, this network comprises two branches; one resistive in nature and including the input impedance 43 of one of the averaging networks and the other reactive in nature and including in series the input impedance 41 of the other averaging network. More specifically, the source of voltage E whose frequency is to be measured is connected in series with the terminals 61 and 62 of network 40X by a reactor 87, preferably a capacitor, and a rectifier 88 which permits passage of current of one polarity through the network 40X. The current impulses of reverse polarity are bypassed around the network 40X by the reversely-poled rectifier 89. These positive pulses of current are smoothed by the averaging network 40X so that the output impedance 48 is traversed by a steady unidirectional current whose magnitude is dependent on the frequency and the magnitude of voltage E.

The source of voltage E is also connected in series with the terminals 65, 66 of network 40S by a resistor 83 and a rectifier 85 which allows the positive half-waves to pass through the network 40S. The half-waves of reverse polarity are bypassed about the network 40S by the reversely-poled rectifier 86. The positive pulses so impressed on network 40S are smoothed by it so that its output impedance 44 is traversed by a unidirectional current whose magnitude is dependent only upon the magnitude of voltage E and independent of its frequency.

The values of 83 and 87 may be so chosen that their impedances are equal at a frequency corresponding with the mid-scale setting of contact 45 and are preferably high with respect to that of the input impedances 41 and 43. For higher frequencies, more current will be passed by the capacitor 87 than by resistor 83 whereas for lower frequencies less current flows in the capacitative branch of the network, Fig. 8, than through the resistive branch.

Measurement of the ratio of the unidirectional currents traversing the output resistors 44, 48, therefore, is a measurement of the frequency of voltage E. Fluctuations in magnitude of voltage E do not substantially affect accuracy in this measurement of frequency because they similarly affect both currents and, therefore, are eliminated in determination of the ratio of these currents.

From these examples, other measuring systems using the basic measuring circuit should be evident to those skilled in the art. It shall further be understood the invention is not limited to the particular arrangements disclosed but shall comprehend changes and modifications within the scope of the appended claims.

What is claimed is:

1. Means for measuring the ratio of the average magnitudes of two fluctuating unidirectional currents comprising two filter networks having input circuits through which said currents respectively individually flow, and a balanceable network including a null indicator in circuit with known percentages of the output impedances of said networks.

2. Means for measuring the ratio of the average magnitudes of two fluctuating unidirectional currents comprising two filter networks having similar time-response characteristics and through whose input circuits said currents respectively individually flow, and a balanceable network including a null indicator in circuit with known percentages of the output impedances of said networks.

3. Means for measuring the ratio of the average magnitudes of two fluctuating unidirectional currents comprising two averaging networks having input circuits through which said currents respectively individually flow, and a balanceable circuit including a null indicator connected in circuit with a known fixed percentage of the output impedance of one of said networks and in circuit with a known variable percentage of the output impedance of the other of said networks.

4. Means for measuring the ratio of the average magnitudes of two fluctuating unidirectional currents comprising two averaging networks having input circuits through which said currents respectively individually flow, each of said networks also including resistance and capacitance affording a time-response characteristic substantially similar to that of the other network, and a balanceable circuit including a null indicator, a known fixed percentage of the output impedance of one of said networks and a known variable percentage of the output impedance of the other of said networks.

5. Means for measuring the ratio of the average magnitudes of two fluctuating unidirectional currents comprising two averaging networks each having shunt input and output impedances, means for connecting said shunt input impedances respectively individually in circuit with the sources of said currents, and a balanceable circuit including a null indicator, a known fixed percentage of the output impedance of one of said networks and a known variable percentage of the output impedance of the other of said networks.

6. Means for measuring the ratio of the average magnitudes of two fluctuating unidirectional currents comprising two averaging networks each having shunt input and output resistive terminations, resistive series branches and shunt capacitative branches affording a time-response characteristic substantially similar to that of the other network, means connected to said networks for flow of said currents individually through the corresponding input terminations of said networks, and a balanceable circuit including a null indicator, a known fixed percentage of the shunt output resistance of one of said networks, and a known, continuously variable percentage of the shunt output resistance of the other of said networks.

7. Means for continuously measuring the ratio of the average magnitudes of two fluctuating unidirectional currents comprising two filter networks whose input circuits respectively include the sources of said currents, and a self-balancing network comprising a fixed percentage of the output impedance of one of said networks, a variable percentage of the output impedance of the other of said networks, and means responsive to unbalance of the voltages across said percentages of the output impedances to adjust said variable percentage, said networks having substantially similar time responses slow with respect to fluctuations of said currents.

8. Means for continuously measuring the ratio of the average magnitudes of two fluctuating unidirectional currents comprising two filter networks each having shunt input and output resistors, means for including the sources of said currents respectively individually in circuit with the input resistors of said networks, and a self-balancing network effectively including a fixed portion of the output resistor of one of said networks and a variable portion of the other output resistor, and balancing means for adjusting said variable portion in response to unbalance of the voltage drops across the effective portions of said output resistors, said networks also including series branch resistors and shunt branch capacitors affording time responses for the networks which are substantially equal and slow with respect to the periods of fluctuations of said currents.

9. A spectrographic analyzer comprising two photomultiplier tubes respectively responsive to selected spectrum lines of a sample forming a light source, a common source of anode current for said tubes, two averaging networks each comprising an input resistor in series with said current source and one of said tubes, one or more sections comprising series resistance and shunt capacity and an output resistor, and a balanceable circuit including a known fixed portion of one of said output resistors, a known, continuously variable portion of the other of said output resistors, and means responsive to unbalance of the voltages across said portions of said output resistors.

10. A spectrographic analyzer comprising two photomultiplier tubes respectively responsive to selected spectrum lines of a sample forming a light source, two averaging networks whose input circuits respectively include said tubes, a self-balancing network effectively including a fixed portion of the output impedance of one of said networks, a variable portion of the output impedance of the other of said networks and balancing means responsive to unbalance of the voltages across said effective portions of said output impedances to adjust said variable portion, and structure positioned by said balancing means to indicate or record the ratio of the intensities of said selected spectrum lines.

11. A spectrographic analyzer comprising two photomultiplier tubes respectively responsive to selected spectrum lines of a sample forming a light source, a common source of anode current for said tubes, two averaging networks each comprising an input resistor in series with said current sources and one of said tubes, one or more sections comprising series resistance and shunt capacity and an output resistor, a self-balancing network effectively including a fixed portion of one of said output resistors, a variable portion of the other output resistor and balancing means responsive to unbalance of the voltages across effective portions of said output impedances to adjust said variable portion, and structure positioned by said balancing means to indicate or record the ratio of the intensities of said spectrum lines.

12. A spectrographic analyzer comprising two photomultiplier tubes respectively responsive to selected spectrum lines of a sample, a common source of anode current for said tubes, two averaging networks each comprising an input resistor in series with said current source and one of said tubes, at least one section of series resistance and shunt capacity and an output resistor, a balanceable circuit including a known fixed portion of one of said output resistors, a known, continuously variable portion of the other of said output resistors and means responsive to unbalance of the voltages across said portions of said output resistors, and means for checking for stray currents in one of said tubes comprising a high resistance connected between said output resistors slightly to raise the balance point for null light input to said one cell.

13. A spectrographic analyzer comprising two photomultiplier cells respectively responsive to selected spectrum lines of a sample, two resistors each connected at one terminal to a source of anode current for said tubes and at its other terminal to one of said tubes, current-responsive means connected between said other terminal of one of said resistors and a contact adjustable along the other of said resistors, calibrated means coacting with said contact for null response of said means to indicate or record the ratio of the intensities of said lines, and means for checking for stray currents of one of said tubes comprising a high resistance connected between said other terminals of said resistors slightly to raise the position of said contact for which there is null response of said means to null light input to said one cell.

14. A system for measuring the phase relation of two varying currents having the same frequency or repetition rate comprising an electronic switch including two tubes each respectively rendered conductive each time one of said currents reaches a predetermined point in its cycle and rendered non-conductive each time the other of said currents reaches the corresponding point in its cycle, two averaging networks respectively having input impedances in the output circuits of said tubes and having output impedances each traversed by steady unidirectional current of magnitude determined by the relative duration of the conducting and non-conducting periods of the associated tube, and a balanceable circuit including known portions of said output impedances, and a detector responsive to unbalance of the voltage drops across said portions of said output impedances.

15. A system for measuring the phase relation of two varying currents having the same frequency or repetition rate comprising an electronic switch including two tubes each respectively rendered conductive each time one of said currents reaches a predetermined point in its cycle and rendered non-conductive each time the other of said currents reaches the corresponding point in its cycle, two averaging networks respectively having input impedances in the output circuits of said tubes and having output impedances each traversed by steady unidirectional current of magnitude determined by the relative duration of the conducting and non-conducting periods of the associated tube, a self-balancing network effectively including a fixed portion of the output impedance of one of said networks, a variable portion of the output impedance of the other of said networks, and balancing means responsive to unbalance of the voltages across effective portions of said output impedances to adjust said variable portion, and structure positioned by said balancing means to indicate or record the ratio of said unidirectional currents in terms of phase relation of said two varying currents.

16. A system for measuring the frequency of an alternating current comprising two averaging networks having input and output impedances, a rectifier and resistance means in series with the source of said current and the input impedance of one of said networks, a rectifier and reactance means in series with said source and the input impedance of the other of said networks, and a balanceable circuit including a fixed portion of the output impedance of one of said networks, a variable portion of the output impedance of the other of said networks and a detector responsive to unbalance of the voltage across said fixed and variable portions of said output impedances.

17. A system for measuring the frequency of an alternating current comprising two averaging networks having input and output impedances, a rectifier and resistance means in series with the source of said current and the input impedance of one of said networks, a rectifier and reactance means in series with said source and the input impedance of the other of said networks, a self-balancing circuit comprising a fixed portion of one of said output impedances, and a variable portion of the other of said output impedances, and a detector responsive to unbalance of the voltages across said portions of said output impedances automatically to effect adjustment of said variable portion.

18. An electrical system for measuring the ratio of the average magnitudes of two fluctuating unidirectional currents including two averaging networks having similar time constants, each comprising an output resistor and an input resistor which is traversed by current from one of said sources, a balanceable circuit including a known fixed percentage of one of said output resistors, a known continuously variable percentage of the other of said output resistors and means responsive to unbalance of the voltages across said percentages of said output resistors, and means for varying the sensitivity of the system without impairment of the averaging properties of said networks including means for varying the percentage of at least one of said input resistors which is connected across the corresponding current source.

19. A self-balancing electrical system for measuring the ratio of the average magnitudes of two fluctuating unidirectional currents including two averaging networks having similar time constants and each comprising an output resistor and an input resstor which is traversed by current from one of said sources, and a self-balancing network including all of one of said output resistors, a variable percentage of the other of said output resistors and means responsive to unbalance of the voltages respectively across all of said one of the output resistors and said variable percentage of the other of said output resistors for adjusting said variable percentage, said one of the output resistors being of resistance high with respect to the remainder of the resistance of said network to avoid hunting and overshooting.

ALBERT J. WILLIAMS, Jr.

REFERENCES CITED

The following references are of record in the file of this patent:

UNITED STATES PATENTS

| Number | Name | Date |
|---|---|---|
| 2,213,534 | Rowe | Sept. 3, 1940 |
| 2,281,995 | Purington | May 5, 1942 |
| 2,287,808 | Lehde | June 30, 1942 |
| 2,331,138 | Ryder | Oct. 5, 1943 |
| 2,349,261 | Ginzton | May 23, 1944 |
| 2,367,746 | Williams | Jan. 23, 1945 |
| 2,375,775 | Evjen | May 15, 1945 |
| 2,391,271 | Rich | Dec. 18, 1945 |
| 2,412,111 | Wilson | Dec. 3, 1946 |
| 2,425,059 | Fagen | Aug. 5, 1947 |